March 12, 1940.　　　H. C. OSBORNE　　　2,193,075
PRESSURE REGULATOR VALVE FOR OIL BURNERS
Filed March 7, 1938
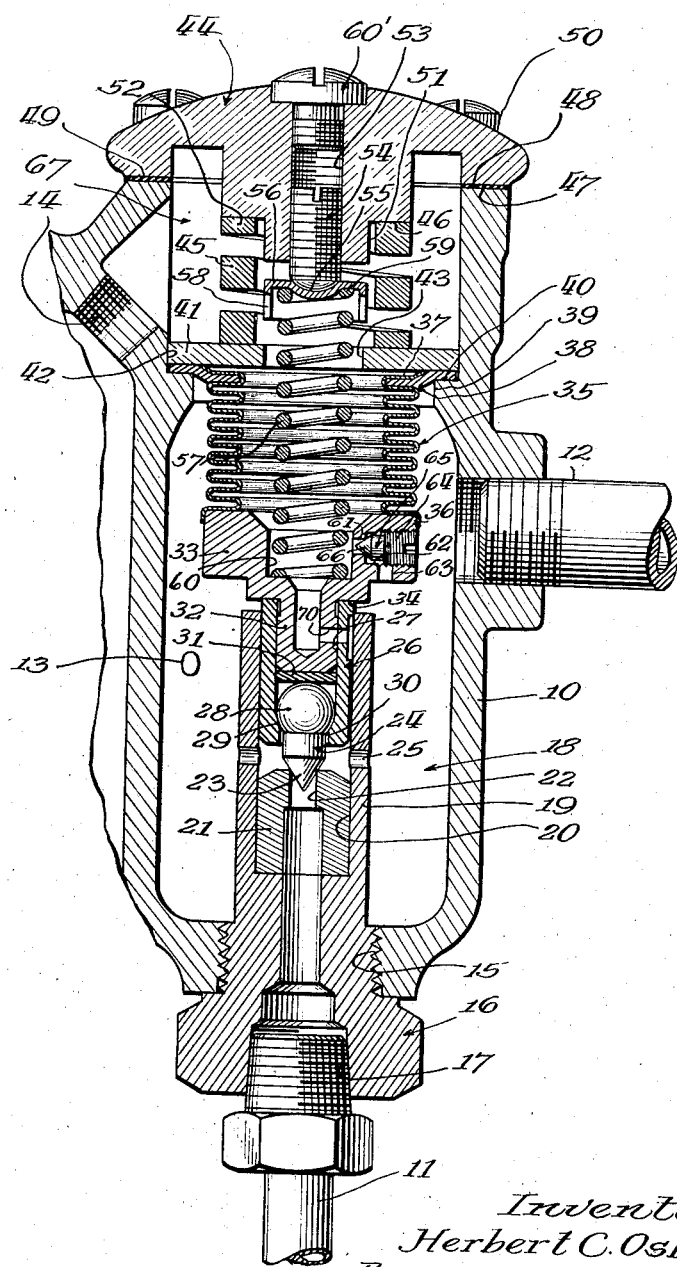
Inventor:
Herbert C. Osborne
By
Williams, Bradbury, McCaleb & Hinkle
Attys.

Patented Mar. 12, 1940

2,193,075

UNITED STATES PATENT OFFICE 2,193,075

PRESSURE REGULATOR VALVE FOR OIL BURNERS

Herbert C. Osborne, Racine, Wis., assignor, by mesne assignments, to Webster Electric Company, Racine, Wis., a corporation of Delaware Application March 7, 1938, Serial No. 194,281

3 Claims. (Cl. 137—153)

The present invention relates to pressure regulator valves for oil burners, and is particularly concerned with the type of pressure regulator valves which have a by-pass valve and a burner valve, both of which are preferably controlled by the same pressure responsive means.

One of the objects of the invention is the provision of an improved pressure regulator valve which is adapted to provide a supply of liquid fuel under substantially constant pressure, whereby the tendency toward furnace flutter in certain furnaces of the prior art is diminished or substantially eliminated.

Another object of the invention is the provision of an improved fuel regulator valve which is provided with means for compensating for the variation in slippage which exists in the fuel regulator units of the prior art.

Another object of the invention is the provision of an improved fuel regulator valve having a by-pass arrangement by means of which the pressure may be regulated and the amount of by-pass may be regulated.

Another object of the invention is the provision of an improved fuel regulator valve which is adapted to be adjusted for changes in viscosity of the oil which may be caused either by changes in fuel or changes of temperature of the oil in the tank.

Another object of the invention is the provision of an improved fuel regulator valve having pressure responsive means for controlling the flow of liquid fuel to the oil burner and having a variable and adjustable independent means for by-passing liquid fuel back to the intake of the pump or to the source of supply of liquid fuel.

Another object of the invention is the provision of an improved fuel regulator valve having adjustable means for varying the amount of by-pass whereby the valve may be adjusted for differences in individual furnaces of the same make or for furnaces of different manufacture so as to stop furnace flutter, such as has been experienced with some of the devices of the prior art.

Referring to the single sheet of drawings, this is a fragmentary vertical sectional view of a fuel regulator valve, taken on a plane which passes through the inlets and outlets of the housing and through the axis of the burner valve and pressure responsive bellows.

Although the housing 10 is shown broken away at the left side as it would be when it is a part of a fuel unit, including a pump and a strainer, it should be understood that the present regulator valve may be embodied in single valve units, separate and distinct from any combined valve pump and strainer assembly, in which case the inlets and outlets would be located in the same position, but a housing would not be attached to the pump housing.

The housing 10 may consist of a substantially cylindrical cast metal member which is provided with a burner outlet conduit 11, a fuel inlet, such as the conduit 12, or a conduit 13, which may be formed in the housing leading from the pump. In the combined unit type, the conduit 12 would be used for attachment of a gauge or the like, but in the separate valve type the conduit 13 might be replaced by a separate inlet like the inlet 12.

The housing also includes a by-pass outlet 14, which leads to a reservoir in the valve-strainer-pump combined unit, and which in the separate unit is connected with a pipe leading back to the intake of the pump or to the supply tank.

The housing 10 is provided at its lower end with a threaded bore 15 for receiving a non-circular plug 16 having a threaded bore 17 for receiving the conduit 11. The plug 17 may be extended into the valve chamber 18, where it is provided with a sleeve 19 having a cylindrical bore 20.

The lower end of the cylindrical bore may support and receive a valve seat member 21, having a valved aperture 22 adapted to be closed by the conical end 23 of a valve member 24. Liquid fuel has access to the bore 22 through a plurality of apertures 25 extending through the sleeve 19 above the valve seat member 21.

The sleeve 19 slidably supports a piston 26, which may comprise a cylindrical metal member having an internal bore 27 adapted to receive the ball 28 of the valve member 24. Cylinder 26 is provided with a by-pass opening 70, which is adapted to be uncovered, and which places the chamber 18 in communication with the interior of the bellows 35 when a predetermined pressure is reached in the chamber 18.

The bore 27 is provided with a partially spherical inner end surface 29 for engaging the ball 28, and with a smaller bore 30 for receiving the stem of the valve member 24 with a clearance. Thus the valve member 24 is mounted for limited universal movement in the piston 26. The valve member 24 may be backed by a washer 31, and the piston 26 may be fixedly mounted on a substantially cylindrical body 32 carried by the bellows head 33.

The piston 26 may be a tight frictional fit on the cylindrical body 32, being driven home against the annular surface 34. The bellows head 33 may be movably supported by a pressure responsive bellows 35, the bellows having an end flange 36, which fits over the cylindrical body of the bellows head 33 and is soldered, brazed, or otherwise secured with a fluid tight fit to the bellows head 33. The other end of the bellows 35 may have its final outwardly extending flange

37 curved about a partition washer 38 to which the flange 37 is secured also by soldering, brazing, or other convenient fastening means so that there is a fluid-tight fit between the bellows 35 and the washer 38.

The housing 10 is provided with a substantially cylindrical valve chamber 18, which has an inwardly extending annular flange 39 adjacent the upper end of the bellows. The flange 39 has an upper annular surface 40, against which the washer 38 rests, and a relatively heavy plate or washer 41 also fits in the cylindrical socket 42 above the annular shoulder 40 and engages the washer 38. The plate 41 has a centrally located aperture 43 for passing the liquid fuel which is to be by-passed by the valve unit. The plate 41 may be secured in place by means of the cover 44 and a relatively heavy compression spring 45, which engages the plate 41 and is in turn engaged by the spring seat 46 carried by the lower surface of the cover 44.

The cover 44 may comprise a cast metal member provided with a ground seating surface 47 for engaging the upper ground end 48 of the valve housing 10. A gasket 49 may be interposed between the surfaces 47, 48, and the cover may be secured in place by a plurality of suitable screw bolts 50 passing through the cover and threaded into the body of the housing 10.

The compression spring 45 may be made of spring metal of rectangular section in helical form, fitting loosely about a centrally located hub 51 and having the endmost turns suitably tapered as at 52, so that the spring 45 has two ends which comprise plane surfaces parallel to each other.

The initial length of the spring 45 is greater than the distance shown in the drawing between the seat 46 and the washer 41 so that the spring 45 is compressed when the screws 50 of the cover are driven home. Thus the cover 44 and spring 45 cause the plate 41 to clamp the washer 38 in place, and the partition 38 is securely held when the cover is placed on the housing. The strength of the spring 45 is such that it is so stiff that the ordinary pressures to which the bellows 35 will be subjected would not affect the spring 45; but if there is an excessive pressure on the bellows 35, such pressure might cause the washer 38 and the plate 41 to lift from its seat 40 and by-pass the excessive pressure, without causing breakage of the housing or bellows.

The cover 44 also preferably has a centrally located threaded bore 53 for receiving the pressure adjustment screw 54, which has a partially spherical end 55 for engaging in a complementary socket in the cup member 56.

The cup member 56 is adapted to receive one end of the bellows spring 57, and the cup 56 may be provided with slots 58 in order to prevent the position of the cup from interfering with the flow of the by-passed liquid, which passes through the aperture 43. The ends of spring 57 may likewise be tapered as at 59 so as to provide the spring with parallel plane surfaces, and the opposite end of the spring 57 may be seated in a cylindrical socket 60 in the bellows head 33.

The spring 57 is of such strength that it may be used to regulate the pressure at which the bellows 35 will be actuated. It is shown under initial compression, and its compression may be increased by threading the screw 54 downward. The threaded bore 53 may be closed at the top by means of a screw bolt 60'.

The bellows head 33 comprises a metal member which may be of substantially cylindrical form and which is provided with an internal bore 60 for receiving the spring 57. The bore 60 also communicates with the interior of the bellows and is in communication with the chamber 18 through a radially extending conduit 61, and a threaded bore 62, and a vertically extending conduit 63.

The threaded bore 62 is adapted to receive the threaded body 64 of a by-pass valve member 65, having a conical end 66. The valve member 65 is used to adjust the amount of by-pass through the conduits 61, 62, and 63 from the chamber 18 into the interior of the bellows 35.

The interior of the bellows 35 leads through the aperture 43, slots 58, into the chamber 67 above the partition washer 38, and chamber 67 is in communication with the by-pass outlet 14.

The operation of the present regulator valve unit is as follows: When liquid fuel under pressure is supplied to the chamber 18 through the conduit 13 leading from the pump, the pressure builds up and is exerted against the bellows 35, and particularly the bellows head 33 and on the end of the piston 26. This causes the contraction of the bellows 35, moving piston 26 upward, and with it the valve member 24, opening the burner port 22.

The upward movement of the piston 26 continues until the by-pass port 70 is opened, and thereafter the excess liquid fuel is by-passed back to the intake of the pump or to the fuel tank, and the pressure is maintained constant at the fuel burner outlet 19 by the regulator valve.

During this time the by-pass valve 65 is constantly passing a predetermined amount of liquid fuel, but the amount is not such as to interfere with the operation of the bellows and piston. The burner port is thus opened and liquid fuel is supplied to the burner through the conduit 11.

The secondary by-pass 61, 65 provides a constant leakage past the bellows to the by-pass outlet 14 and comes into play when the burner is turned off, to prevent fluttering. When the oil burner is turned off by its controls, the motor, pump, and fan slow down as the rotational inertia diminishes. Upon reduction of oil pressure, the bellows 35 tends to expand, and the action and order of closure of the valves is, of course, the reverse of that described with respect to the increase of pressure. As the bellows expands, the by-pass port 70 is closed first, and thereafter oil can only escape through the burner port 22, which is next to be closed. The pressure drops in chamber 18, and the spring 57 and bellows 35 tend to close burner valve 24. In the devices of the prior art not having the by-pass 61, 65, this pressure does not decrease fast enough to prevent more oil going to the burner than the diminished air supply could oxidize efficiently. This results, in furnaces having narrow air passages, in furnace flutter with the devices of the prior art.

The reduction in pressure necessary to produce a quick valve closure is brought about by means of the by-pass 61, 65, which permits the pressure in the chamber 18 to drop very quickly, thus permitting the by-pass 70 and burner port 19 to close. This causes the oil to be shut off positively and quickly when the burner is shut down, and it is found that the regulable by-pass valve 65 may be adjusted to eliminate furnace flutter in various installations, which could not be properly handled by the devices of the prior art.

Even though very small tolerances are permitted on the valve plunger and guide and very small tolerances are permitted on the gears and gear plate of the pump, there is still a considerable variation in slippage between different units and different pumps. This slippage may be readily compensated by adjusting the screw valve 65, which regulates the by-pass, and after the pump and valve have worn for a year or two it may be desirable to again adjust the screw valve 65 to compensate for increased slippage. Otherwise the desired pressure might not be obtained.

It has been found with certain individual furnaces that an increase in the area of the by-pass slot in the piston is required and that furnace flutter may be positively stopped by increasing the amount of by-pass. With a regulator valve constructed according to the present invention the amount of leakage by-passed may be readily regulated at any time, and the by-pass may be such that after the pump has shut down the pressure will decrease very quickly in the chamber 18 and the burner valve 24 will be permitted to seat positively and quickly.

The regulator valve may also be adjusted for changes in viscosity of the oil, due to changes of the fuel itself, or changes of temperature of the fuel in the tank, and the regulator valves constructed according to the present invention have a wider range of advantages and operation than any of the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a pressure regulator valve for oil burners or the like, the combination of a metal housing provided with burner outlet, by-pass outlet, and inlet ports, said housing being formed with a pressure chamber, a pressure responsive diaphragm member carried by said housing in said pressure chamber and constantly subjected to the pressure in said chamber, burner port valve means actuated by said pressure responsive diaphragm for controlling said burner port, and by-pass valve means actuated by said pressure responsive diaphragm for controlling said by-pass port, said by-pass valve means having its cut-off point located to be reached on closing movement before the cut-off point of said burner valve means is reached whereby liquid fuel is adapted to be supplied at a predetermined pressure to said burner port, and an excess of liquid fuel is adapted to be by-passed through said by-pass port, and an auxiliary by-pass outlet leading from said pressure chamber to said by-pass outlet for by-passing a predetermined amount of liquid fuel during the operation of said regulator valve, and adjustable means for regulating the size of aperture of said auxiliary by-pass opening, whereby when the supply of liquid fuel under pressure to said chamber diminishes, the by-pass port is adapted to be closed first and the burner port adapted to be closed thereafter, the liquid in said pressure chamber continuing to be by-passed through said auxiliary by-pass in order to effect a quick decrease of pressure in said chamber, and a quick and positive cut-off of the burner port.

2. In a pressure regulator valve for oil burners or the like, the combination of a metal housing provided with burner outlet, by-pass outlet, and inlet ports, said housing being formed with a pressure chamber, a pressure responsive diaphragm member carried by said housing in said pressure chamber and constantly subjected to the pressure in said chamber, burner port valve means actuated by said pressure responsive diaphragm for controlling said burner port, and by-pass valve means actuated by said pressure responsive diaphragm for controlling said by-pass port, said by-pass valve means having its cut-off point located to be reached on closing movement before the cut-off point of said burner valve means is reached whereby liquid fuel is adapted to be supplied at a predetermined pressure to said burner port, and an excess of liquid fuel is adapted to be by-passed through said by-pass port, and an auxiliary by-pass outlet leading from said pressure chamber to said by-pass outlet for by-passing a predetermined amount of liquid fuel during the operation of said regulator valve, and adjustable means for regulating the size of aperture of said auxiliary by-pass opening, whereby when the supply of liquid fuel under pressure to said chamber diminishes, the burner port is adapted to be closed first and the by-pass port is adapted to be closed thereafter, the liquid in said pressure chamber continuing to be by-passed through said auxiliary by-pass in order to effect a quick decrease of pressure in said chamber and a quick and positive cut-off of the burner port, the said auxiliary by-pass port being located in a metal body carried by said diaphragm and extending from said pressure chamber to the other side of said diaphragm.

3. In a pressure regulator valve for oil burners or the like, the combination of a metal housing provided with burner outlet, by-pass outlet, and inlet ports, said housing being formed with a pressure chamber, a pressure responsive diaphragm member carried by said housing in said pressure chamber and constantly subjected to the pressure in said chamber, burner port valve means actuated by said pressure responsive diaphragm for controlling said burner port, and by-pass valve means actuated by said pressure responsive diaphragm for controlling said by-pass port, said by-pass valve means having its cut-off point located to be reached on closing movement before the cut-off point of said burner valve means is reached whereby liquid fuel is adapted to be supplied at a predetermined pressure to said burner port, and an excess of liquid fuel is adapted to be by-passed through said by-pass port, and an auxiliary by-pass outlet leading from said pressure chamber to said by-pass outlet for by-passing a predetermined amount of liquid fuel during the operation of said regulator valve, and adjustable means for regulating the size of aperture of said auxiliary by-pass opening, whereby when the supply of liquid fuel under pressure to said chamber diminishes, the burner port is adapted to be closed first and the by-pass port is adapted to be closed thereafter, the liquid in said pressure chamber continuing to be by-passed through said auxiliary by-pass in order to effect a quick decrease of pressure in said chamber and a quick and positive cut-off of the burner port, the said auxiliary by-pass port being located in a metal body carried by said diaphragm and extending from said pressure chamber to the other side of said diaphragm, said adjustable means comprising a threaded member accessible to the outside of said casing through one of the ports of said housing.

HERBERT C. OSBORNE.